UNITED STATES PATENT OFFICE.

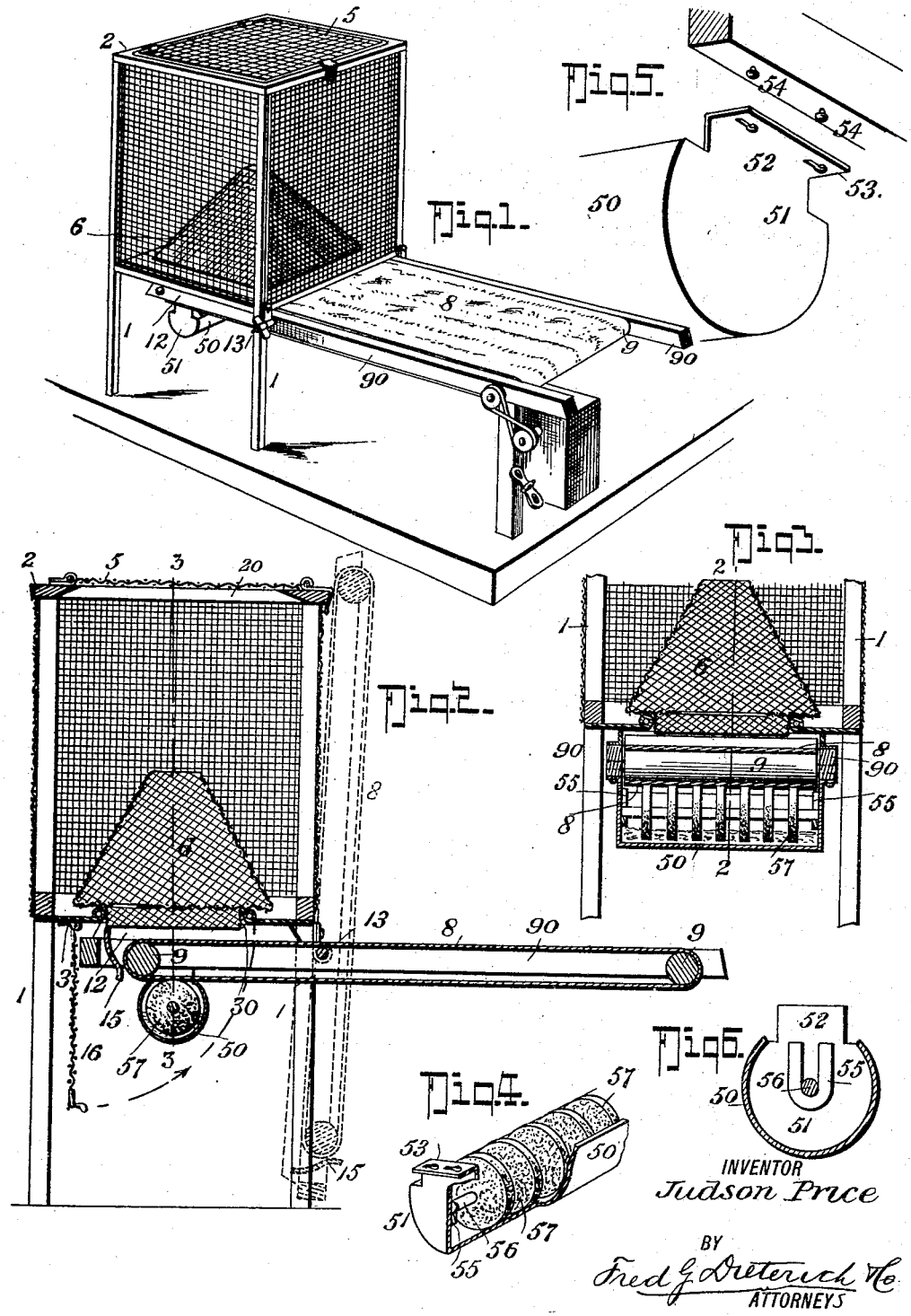

JUDSON PRICE, OF POPLAR BLUFF, MISSOURI.

FLY-TRAP.

1,189,481.  Specification of Letters Patent.  Patented July 4, 1916.

Application filed July 1, 1915. Serial No. 37,523.

*To all whom it may concern:*

Be it known that I, JUDSON PRICE, residing at Poplar Bluff, in the county of Butler and State of Missouri, have invented a new and useful Improvement in Fly-Traps, of which the following is a specification.

This invention, which generally has reference to that class of fly traps in which is included an endless baited conveyer or belt for carrying the baited flies to a catching cage, more particularly seeks to provide a new and improved means for automatically baiting the endless conveyer mechanism shown and described in a copending application Serial No. 856,189, filed August 10, 1914, and allowed April 20, 1915, and my said invention seeks to provide a simple and inexpensive attachment for the conveyer belt shown in the application referred to, that will continuously supply the said belt with the bait while in its operative or traveling condition, and with other objects in view that will hereinafter appear, my present invention is in the nature of a trough-like holder adapted for being pendently supported on the delivery end of the frame that carries the endless conveyer, in which the bait substance is held, and one or more disks of absorbent material rotatably hung in the trough to travel through the bait at the bottom of the trough and having their upper edges held in contact with the endless conveyer belt, which forms the means for transmitting rotation to the said disks.

In its more subordinate features my invention embodies the details of construction and novel arrangement of the parts hereinafter fully explained, specifically pointed out in the accompanying drawing, in which:—

Figure 1 is a perspective view of my improved fly trap, the parts being at their operative position. Fig. 2 is a vertical section thereof on the line 2—2 on Fig. 3, the endless conveyer being shown at the folded position in dotted lines for transportation or storage. Fig. 3 is a transverse section taken on the line 3—3 on Fig. 2. Fig. 4 is a detail perspective view, partly in section of the automatic means for supplying the bait to the conveyer or baited belt. Fig. 5 is a detail view that illustrates means for detachably connecting the bait holder or trough to the conveyer belt frame. Fig. 6 is a cross section of the baiter and shows the manner in which the disk carrying shaft is removably held in the bait holder.

The fly catching and trapping means shown and described in this application is preferably the same as the construction disclosed in the copending application before referred to and the same comprises a cage or chamber formed on four standards or legs 1—1 having a top board 2 formed with a central opening 20 through which the caught flies are discharged and normally closed by a hinged screen cover, 5 as shown. The bottom 3 of the holding cage or chamber has a central opening 30 through which the flies pass as they are trapped in the manner presently explained. A conical tube 6 is mounted over the bottom opening 30 through which the flies pass up into the said holder.

8 designates the catcher which is in the nature of an endless conveyer belt and onto which the catching element or bait, in my present invention, is automatically and continuously fed while the conveyer belt is in the operative or moving condition and the said belt passes over rollers 9—9 that are detachably mounted on a rectangular frame whose opposite side arms 90 are removably mounted and pivotally supported on a cross bolt 13 removably held on the front legs 1—1, see Fig. 1.

By mounting the conveyer frame as stated, the inner end is held near the fly entrance or opening 30, by the weight of its outer or projected end, and the said frame with the endless conveyer may be readily detached from the legs 1—1 by pulling out the bolt 13.

The inner or delivery end of the conveyer is held under the conical member 6 into which the flies enter as they are freed from the conveyer and through which they pass into the chamber 3 in which they are held until discharged through the upper end thereof. Guide plates 12 coöperate with the conveyer belt for causing the flies to fly back into the cone 6 and to hold live flies from passing along with the conveyer back toward the front end and a throat member 15 extends over the inner end of the conveyer and connects with the guide plates 12—12 whose upper edges extend to near the bottom of the chamber 3 and whose front ends extend beyond the front roll 9. The guides 12—12 in the retarding member 15 form an end closed restricted passage in which any of the live flies that pass over the inner end of the conveyer are crushed. The dead flies that pass back with the conveyer drop off in passing toward the outer end of the conveyer.

A drop door 16 is hinged to the bottom of the fly holding chamber for closing the bottom of such chamber when the conveyer is swung up to the position shown in dotted lines on Fig. 2.

My automatic means for baiting the conveyer belt hereinbefore referred to and which forms the essential feature of my present invention, comprises a holder 50 constructed like an ordinary oyster can with a segment cut lengthwise of the can and with its end 51 formed with vertical extensions 52 whose upper ends are bent to form flanges 53 for engaging the under face of the longitudinal side bars of the conveyer frame to which they are secured by the studs 54, as shown. The ends 51 of the holder have U shaped hangers 55 on the inner sides, that form the rests for a shaft 56, on which are secured a number of disks 57 of absorbent material preferably felt, and which are of such diameter that their upper edges frictionally engage the lower member of the endless conveyer belt, and the lower edges turn through the bait substance in the bottom of the holder 50.

By reason of mounting the disk carrying shaft in the holder 50, as stated and shown, when the holder is detached from the conveyer frame, the shaft with its disks can be readily removed to provide for cleansing the disks and the holder or can.

From the foregoing description taken in connection with the drawing, the complete construction, the manner of operation and the advantages of my present invention will be readily understood. When the parts are assembled for use, the disks being in frictional contact with the fly catching belt, the latter, as it is traveling along, freely rotates all of the disks and the shaft on which the disks are mounted and in consequence a series of longitudinal streaks of the bait substance is continuously applied to the belt automatically keeping up, as it were, a constant baiting of the belt so long as it is being moved along by the motor devices.

What I claim is:

In a fly trap, a cage and its frame, a conveyer frame secured to the cage structure and lying beneath the entrance to the cage, an endless belt conveyer mounted in the conveyer frame and comprising a trough-like receptacle, means for detachably securing the said receptacle at its ends to the conveyer frame, U bearings in the receptacle, a shaft set in the said bearings and adapted to be removed when the receptacle is detached, and a baiting disk on the shaft to engage the said belt conveyer, all being arranged whereby when the said trough-like receptacle is in place on the said conveyer frame, the engagement of the baiting disk with the belt conveyer will hold the said shaft in its bearings.

JUDSON PRICE.

Copies of this patent may be obtained for five cents each, by addressing the "Commissioner of Patents, Washington, D. C."